United States Patent
Bruno et al.

(10) Patent No.: US 9,211,741 B2
(45) Date of Patent: Dec. 15, 2015

(54) POSITION ENCODER SYSTEMS

(75) Inventors: Javier González Bruno, Terrassa Barcelona (ES); Ignacio Soler Flores, Barcelona (ES); Sergio de Santiago Dominguez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 13/550,952

(22) Filed: Jul. 17, 2012

(65) Prior Publication Data

US 2014/0022556 A1 Jan. 23, 2014

(51) Int. Cl.
- *G01B 11/14* (2006.01)
- *B41J 19/20* (2006.01)
- *G01D 5/244* (2006.01)

(52) U.S. Cl.
CPC ........... *B41J 19/205* (2013.01); *G01D 5/24457* (2013.01)

(58) Field of Classification Search
CPC ............................... G01B 11/14; B41J 19/205
USPC ......................................................... 356/614
See application file for complete search history.

(56) References Cited

U.S. PATENT DOCUMENTS

| | | | |
|---|---|---|---|
| 4,261,039 A * | 4/1981 | Baker et al. ..................... 358/1.5 |
| 4,459,675 A | 7/1984 | Bateson et al. |
| 4,469,993 A * | 9/1984 | Swanson et al. ............... 318/561 |
| 4,473,786 A * | 9/1984 | Miyashita et al. ............. 318/561 |
| 4,523,137 A * | 6/1985 | Wong ............................ 318/604 |
| 4,551,664 A * | 11/1985 | Wong et al. .................... 318/592 |
| 4,688,498 A * | 8/1987 | Carlson ....................... 112/102.5 |
| 4,810,941 A * | 3/1989 | Ohishi et al. .................. 388/815 |
| 5,732,306 A | 3/1998 | Wilczak, Jr. |
| 6,129,464 A | 10/2000 | Nakamura et al. |
| 6,206,594 B1 * | 3/2001 | Elgee et al. ................... 400/703 |
| 6,213,659 B1 * | 4/2001 | Elgee ............................ 400/633 |
| 6,297,610 B1 * | 10/2001 | Bauer et al. ................... 318/562 |
| 6,300,884 B1 * | 10/2001 | Wilson ............................. 341/6 |
| 6,304,825 B1 | 10/2001 | Nowak et al. |
| 7,719,224 B2 | 5/2010 | Quan et al. |
| 7,934,657 B2 * | 5/2011 | Martenson et al. ....... 235/462.25 |
| 2010/0033752 A1 * | 2/2010 | Oi et al. ....................... 358/1.14 |

OTHER PUBLICATIONS

Naotoshi Iwazawa, et al., "Printhead Carriage Transport High Speed Control System with Robust Compensator," Proceedings of the IECON, vol. 3, Nov. 15-19, 1993, pp. 2126-2131.

* cited by examiner

*Primary Examiner* — Roy M Punnoose

(57) ABSTRACT

A position encoder signal control system is disclosed. A position encoder input line receives a position encoder signal and a diagnostic input line receives a position encoder diagnostic signal. An output line is couplable to a position encoder output channel and a controller selectively connects one of the position encoder input line and the diagnostic input line to the output line.

20 Claims, 5 Drawing Sheets

POSITION ENCODER SYSTEMS

BACKGROUND

Position encoders are used in many different systems to sense the position of different parts, subsystems, etc. One such system is a large format printer where a position encoder is typically used to monitor carriage position and is used in controlling of motors that drive the carriage. Position encoders are also used in systems such as tape drives to determine head positioning.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION

A position encoder is an electromechanical device that can measure motion or position. Most encoders use optical sensors to measure motion relative to a target and provide an electrical signal in the form of pulse train as an output, which can, in turn, be translated into motion, direction, or position.

Two common types of position encoders are rotary and linear encoders. Rotary encoders are used to measure the rotational motion of a shaft. A code wheel that includes an optically readable code pattern is mounted on the rotating shaft. An optical sensor is mounted in a fixed position with respect to the code wheel so as monitor the point in the code pattern as the code wheel rotates. The optical sensor typically generates square-wave pulses, which can then be interpreted into position or motion. Linear encoders work under the same principle as rotary encoders except that instead of a rotating code wheel, there is a body that is moved in a linear direction relative to a second, fixed position, body. A code strip is mounted on one body and an optical sensor on the other so as to monitor the point in the code pattern along the length of the code strip.

A quadrature position encoder uses two code tracks with a corresponding sensor for each track. Each code track typically has a code pattern that is 90° out of phase with respect to the other track. The encoder typically has two output channels, one corresponding to each sensor. When considered together, the two output channels can be used to monitor both position and direction of travel. If channel A leads channel B on a rotary quadrature encoder, for example, it can be determined that the code wheel is rotating in a clockwise direction. If B leads A, then it can be determined that the code wheel is rotating in a counter-clockwise direction. Therefore, by monitoring both the number of pulses and the relative phase of signals A and B, the position and direction of travel can be monitored.

Figure 1:
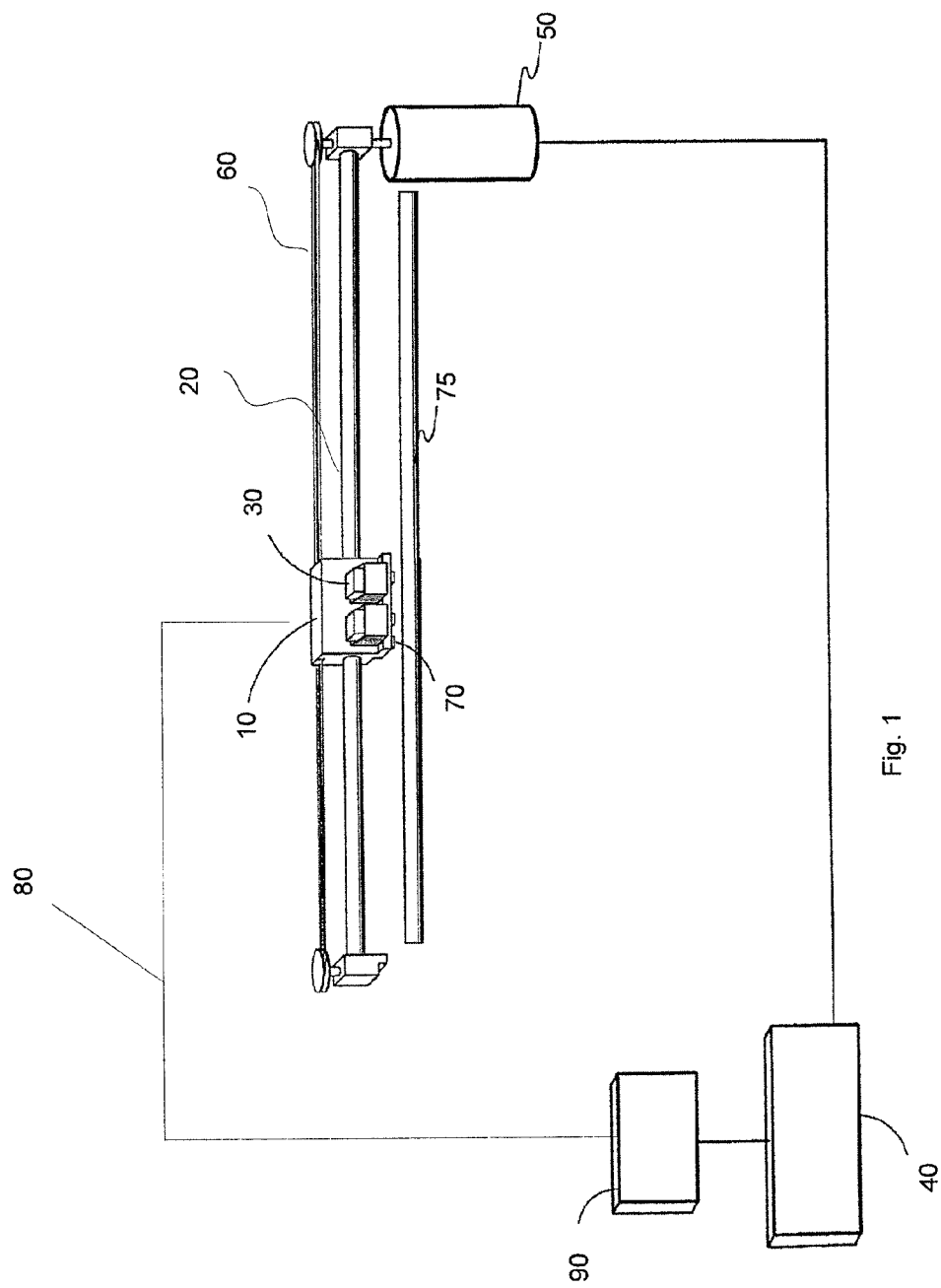
FIG. 1 provides an example of a printer carriage position control system.

FIG. 1 provides an illustration of a printer carriage position control system. A printer carriage assembly 10 is a transport configured to slide or move along a guide 20, such as a rod, bar and/or rack gear. A print head assembly 30 is received on the carriage so as to be moveable along the guide 20 by a print head actuator 40. The print head actuator 40 may include a motor 50 operatively connected to the print head assembly 30 by a drive train and/or transmission 60.

The printer carriage assembly 10 includes a quadrature position encoder 70 and a code strip 75 is positioned along the path of the printer carriage assembly 10. The position encoder 70 is coupled to a position encoder output channel 80. As the printer carriage assembly 10 moves along the guide 20, the position encoder 70 detects the code strip 75 and outputs a quadrature encoded signal via the output channel which is part of a flexible trailing cable 80 that moves with the carriage assembly 10. The quadrature encoded signal is received by a receiver 90 that is coupled to the output channel and is used for, among other things, determining signals applied to the motor 50 to adjust position/movement of the print head assembly 30.

One difficulty in utilizing position encoders for monitoring position in printer carriages has been in diagnosing error or failure conditions associated with the position controller and its associated systems. While signals returned from the position encoder 70 can be monitored to ensure they coincide with those expected due to a drive applied by the motor, diagnosis due to absence of a signal (or an unexpected signal) cannot be progressed beyond identifying that the controller is trying to move the carriage assembly but feedback from the position controller does not reflect drive signals applied. If clearing for paper jams does not fix the problem, it is commonplace for the whole printer carriage assembly to be designated for replacement in order to fix the problem. While this is an expensive way to fix what may be a malfunction of potentially only a small part of the carriage assembly or a different part of the system, it typically fixes the problem/fault which cannot otherwise be easily determined by the printer or by users.

Accordingly, various examples described herein were developed to provide a position encoder signal control system that enables a diagnostic signal to be communicated on a position encoder output line for communication of diagnostic information on the position encoder system, without needing further communication lines. In an example of the disclosure, a position encoder signal control system includes a position encoder input line to receive a position encoder signal, a diagnostic input line to receive a diagnostic signal and an output line couplable to a position encoder output channel. A controller selectively connects one of the position encoder input line and the diagnostic input line to the output line.

Advantages of the examples described herein include that it makes it possible to improve diagnostic functionality and increase information passed between a position encoder and a controller without requiring new hardware communication lines between the encoder and the controller. By controlling access to the position encoder output channel, the position encoder output can be temporarily suppressed and position encoder diagnostic information communicated in its place which the receiving controller can then use to diagnose errors and fault conditions that were not diagnosable from the position encoder output alone. Another advantage of the disclosure is that a position encoder can be automatically tested for fault conditions without requiring user interaction or on site engineer presence. Another advantage of the disclosure is that testing of fault conditions can be performed to a schedule or based on events such as on start-up so as to identify when preventative maintenance is desirable. Another advantage of the disclosure is that certain examples provide for improved robustness against electromagnetic compatability perturbation by increasing the current drained on the position encoder input line. Another advantage of the disclosure is that hardware changes can be local to the position encoder and therefore cheaply and simply applied to existing systems such as printer carriage systems.

Figure 2:
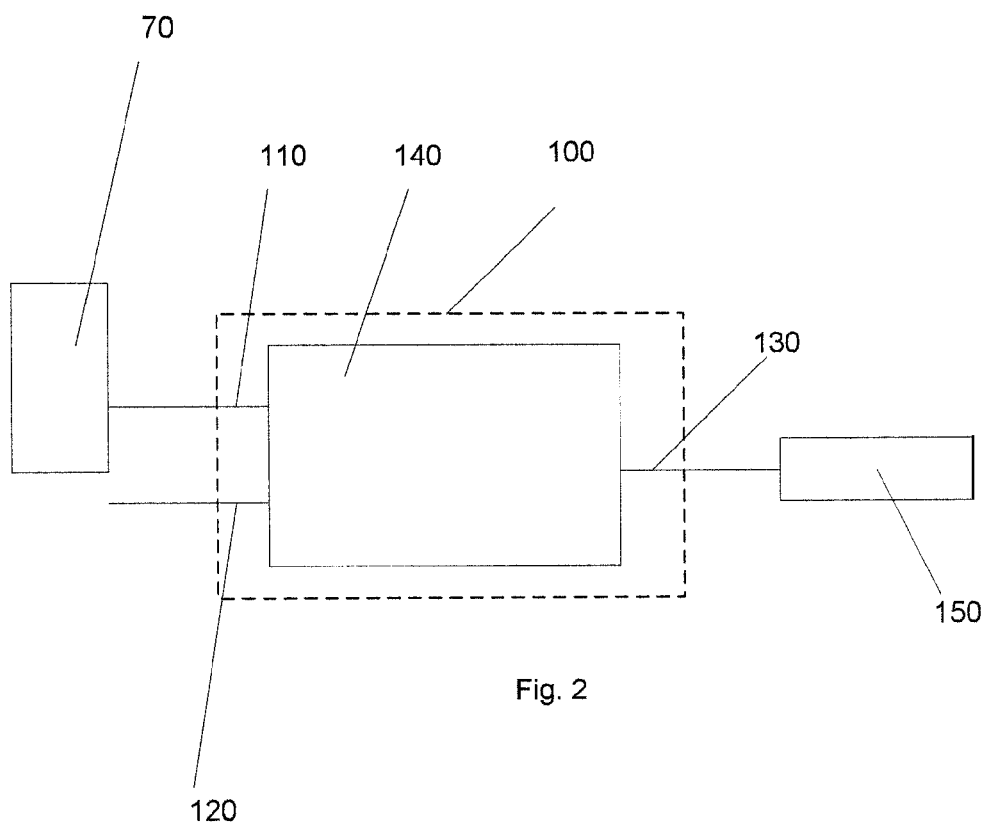
FIG. 2 is a block diagram illustrating a system, according to various examples.

FIG. 2 is a block diagram illustrating a system, according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

FIG. 2 shows a position encoder signal control system 100. A position encoder input line 110 receives a position encoder signal from a position encoder 70. A diagnostic input line 120 receives position encoder diagnostic signals. An output line 130 is coupled to a position encoder output channel 150. A controller 140 selectively connects one of the position encoder input line 110 and the diagnostic input line 120 to the output line 130 to selectively provide a position encoder signal or position encoder diagnostic signal on the output channel 150 via the output line 130.

Figure 3:
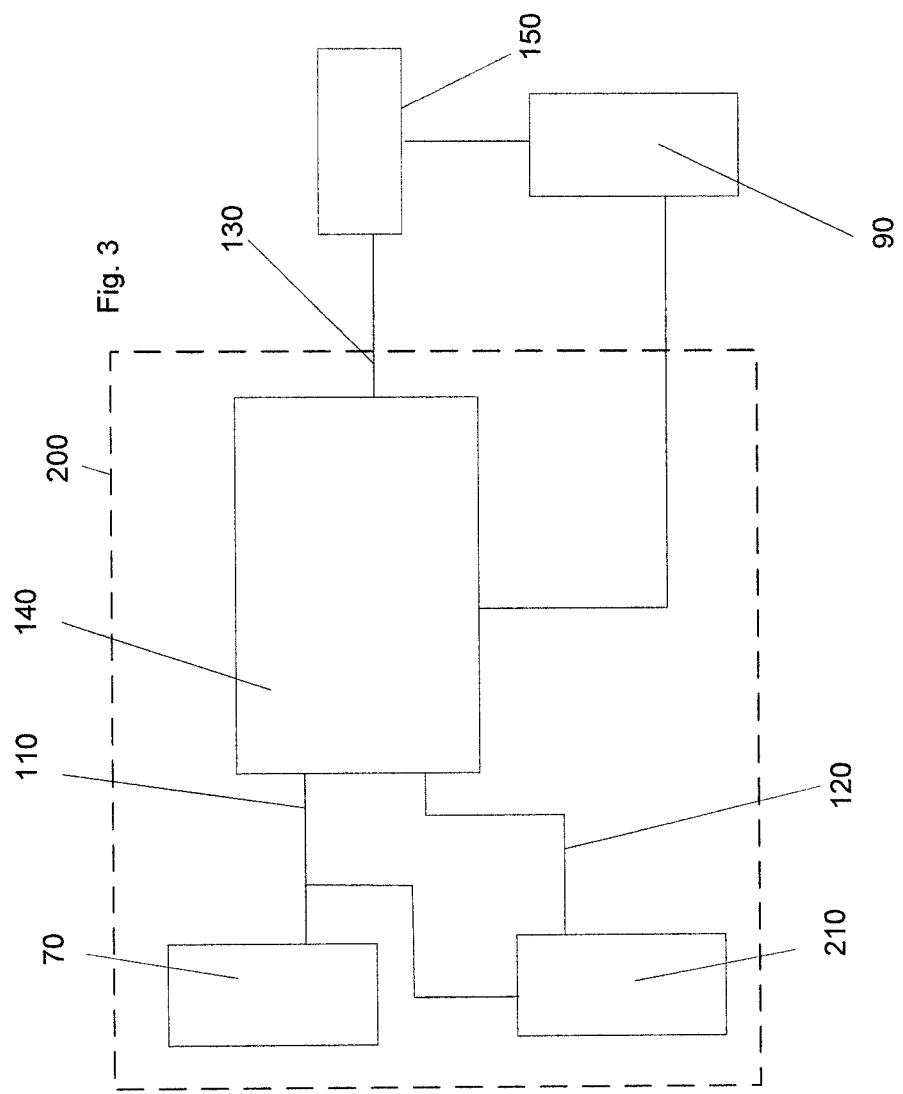
FIG. 3 is a block diagram illustrating a system, according to various examples.

FIG. 3 is a diagram illustrating a system according to various embodiments. FIG. 3 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, Field Programmable Gate Arrays (FPGA),etc.), or some combination of these.

FIG. 3 shows a position encoder system 200. A position encoder 70 generates a position encoder signal on input line 110. A diagnostic module 210 is connected to the position encoder input line 110 and to a diagnostic input line 120. A controller 140 selectively connects one of the position encoder input line 110 and diagnostic input line 120 to an output line 130. The output line 130 is coupled to a position encoder output channel 150 which is in turn connected to a receiver 90. In this manner, the receiver 90 receives one of the position encoder signal and an output from the diagnostic line via the position encoder output channel 150.

When operated in an encoder diagnostic mode, the output from the diagnostic module is switched by the controller 140 to the encoder output channel in place of the position encoder signal.

The diagnostic module 210 may be configured to perform a number of checks on the position encoder and/or the position encoder input line including checks for open lines, lines shorted to ground or Vcc, code strip out of alignment or dirty and encoder failure. The diagnostic module 210 reports on the checks by generating signals on the diagnostic input line 120 which are communicated to the receiver 90 via the encoder output channel 150.

In this example, the diagnostic module encodes its signals using the same coding scheme as that used by the position encoder. For example, if the position encoder was a quadrature position encoder that generated quadrature encoded position encoder signals, the diagnostic module in this example also communicates with the receiver using quadrature encoded signals. Use of a common coding scheme means that a receiver that can already decode signals from the position encoder does not need to be changed or reprogrammed and will also be able to decode signals from the diagnostic module. A separate communication to the receiver 90 may be provided to identify when encoder diagnostic mode is being operated in order for the received signals to be treated as position-encoder-originating or diagnostic-module-originating.

Figure 4:
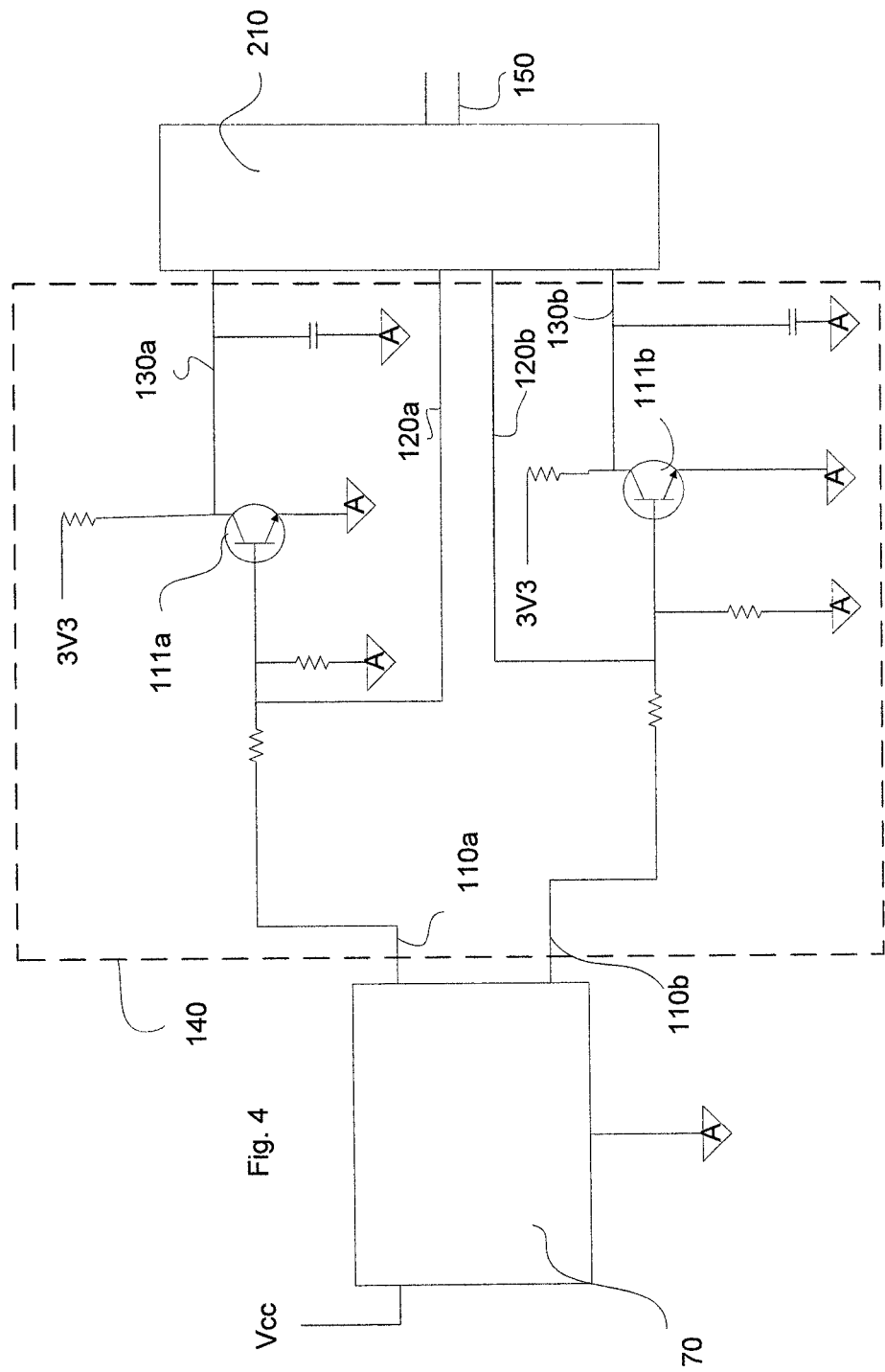
FIG. 4 is a block diagram illustrating a system, according to various examples.

In some examples, a different coding scheme may be used by the diagnostic module to that of the position encoder. In one example, the diagnostic module may be included on the carriage of a printer. In one example it may be part of a pen controller for a printer. In another example, the diagnostic module may be part of the position encoder. FIG. 4 is a diagram illustrating a system according to various embodiments. FIG. 4 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

FIG. 4 shows a position encoder system 200. Position encoder input lines 110a, 110b receive position encoder signals from a quadrature position encoder 70. The signals on the encoder input lines are 90° shifted in phase with respect to each other due to quadrature encoding.

The encoder input lines 110a, 110b are connected to a controller 140 which has a signal path for each input line. Each signal path includes a driver connecting the input line to a corresponding output line. In an example, the driver includes a transistor 111a, 111b. In one example, the driver is an inverter. In one example, the driver includes a transistor. In one example, the transistor is a metal oxide semiconductor type transistor. In another example the transistor is a bipolar junction transistor of PNP type. In another example the transistor is a bipolar junction transistor of NPN type in which a P-doped semiconductor layer is between two N-doped semiconductor layers. The encoder input line is connected to a base junction of the NPN transistor 111a, 111b. The transistor's emitter junction is connected to a respective output line 130a, 130b which is in turn connected to a diagnostic module 210. Diagnostic control lines 120a, 120b are also connected to the respective path and to the diagnostic module 210.

When not operated in diagnostic mode, signals pass from the position encoder 70 through the respective transistors to output lines 130a, 130b after which they are relayed to output channel 150.

When operated in an encoder diagnostic mode, the diagnostic module 210 can take control of the encoder output channel by generating a substantially "0V" signal at diagnostic control lines 120a and 120b. This turns both transistors 111a and 111b off, independently of the position encoder signals on input lines 110a, 110b. The output lines 130a, 130b to the receiver 90 are at high impedance, pulled up by the receiver 90. The diagnostic module 210 controls the position encoder system to perform diagnostics and also generates a quadrature signal for communicating diagnostic results to the receiver 90 via the output channel 150.

The transistors 111a and 111b act as switches controlling passage of the position encoder signals to the receiver 90. However, passsing the position encoder signals through the transitsors 111a and 111b has an additional benefit in that it increases system robustness against EMC perturbation by increasing the current drained on the lines.

The base of the transistors 111a, 111b in this example is controlled through a resistor divider. Open drain outputs may be used if a pull up resistor is included in the circuit. In one example, the position encoder signals are digital.

In one example, the diagnostic module is attached to, or is part of, the carriage of a printer.

The position encoder may be a rotatory or linear encoder, although other types of position encoders could be used.

In one example, when in encoder diagnostic mode, a signal is communicated to the receiver to indicate application of the diagnostic mode. In this way, errors can be ignored should the encoder signal be lost on the output channel 150. Additionally, controls for driving the motor are disabled unless motor control is needed for the diagnostics. In one example, diagnostic mode is applied during start-up routines of the printer system. Diagnostics may typically take in the order of milliseconds.

Figure 5:
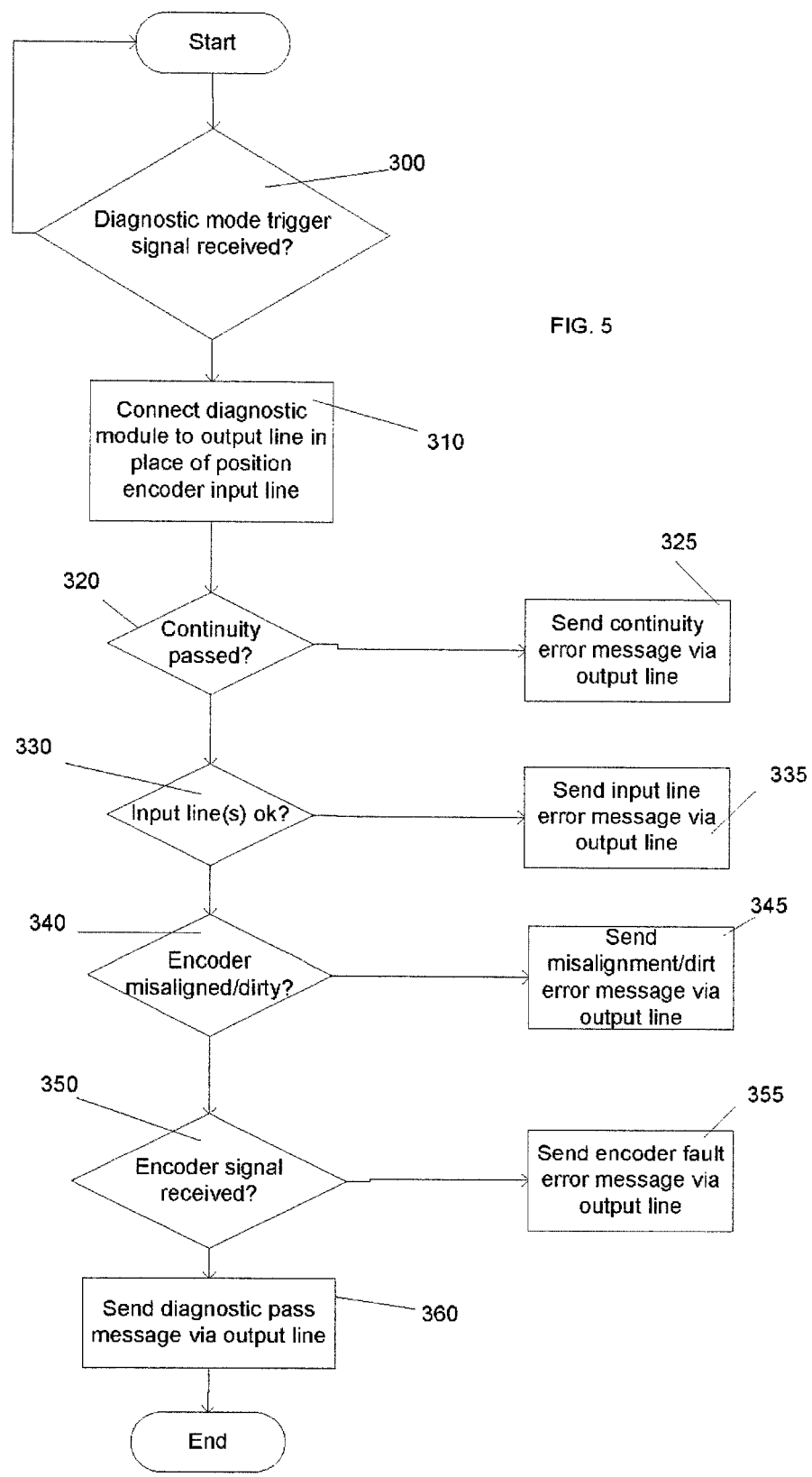
FIG. 5 is a flow diagram depicting steps taken to implement various examples.

FIG. 5 is a flow diagram of operation in a system according to various embodiments. In discussing FIG. 5, reference may be made to the diagrams of FIGS. 2, 3, and 4 to provide contextual examples. Implementation, however, is not limited to those examples. Starting with FIG. 5, diagnostic mode trigger signal is received at block 300. The controller 140 connects the diagnostic module 210 to the output channel 150 in place of the position encoder input line 110 at block 310. The diagnostic module 210 checks at block 320 for a line discontinuity indicating a break or disconnection of a trailing cable 80 to the carriage 10. Upon failure of continuity checks, a first error signal is communicated to the receiver 90 via the output channel in block 325.

Continuing with FIG. 5, if continuity testing in block 320 passes, the diagnostic module 210 checks at block 330 for encoder input line failure using the diagnostic input line 120. Upon detecting input line failure, a second error signal is communicated to the receiver 90 via the output channel in block 335.

Continuing with FIG. 5 at block 340, the diagnostic module 210 communicates with the receiver 90 to cause movement of the motor and carriage. If no signal is detected at the encoder when moving the motor, a third error signal indicating carriage misalignment or dirt on encoder strip is communicated to the receiver 90 via the output channel in block 345.

After carriage alignment has been checked and the encoder strip cleaned, the motor is driven again to cause further movement of the carriage in block 350. If no signal is detected at the encoder when moving the motor, a fourth error signal indicating position encoder failure is communicated to the receiver 90 via the output channel in block 355.

Continuing with FIG. 5 at block 360, diagnostic success is reported to the receiver if no errors are detected and the diagnostic mode is then disabled causing the position encoder signals to be connected to the output channel.

In one example feedback from the motor is also checked to identify motor failure, motor disconnection or motor driver failure.

The functions and operations described with respect to diagnostic module may be implemented as a computer-readable storage medium containing instructions executed by a processor and stored in a memory. Processor may represent generally any instruction execution system, such as a computer/processor based system or an ASIC (Application Specific Integrated Circuit), a Field Programmable Gate Array (FPGA), a computer, or other system that can fetch or obtain instructions or logic stored in memory and execute the instructions or logic contained therein. Memory represents generally any memory configured to store program instructions and other data.

While the disclosed embodiments and implementations generally refer to position encoder systems in carriage based printer systems, embodiments and implementations can be used in other systems for diagnosis of position encoder faults and errors including, for example, tape head positioning systems and print media positioning systems.

Various modifications may be made to the disclosed embodiments and implementations without departing from their scope. Therefore, the illustrations and examples herein should be construed in an illustrative, and not a restrictive, sense.

What is claimed is:

1. A position encoder signal control system comprising:
a position encoder input line to receive a position encoder signal;
a diagnostic input line to receive a position encoder diagnostic signal;
an output line couplable to a position encoder output channel; and,
a controller selectively connecting one of the position encoder input line and the diagnostic input line to the output line, wherein access to the position encoder output channel is controlled and the controller to diagnose a fault condition that was not diagnosable from the position encoder signal alone.

2. The system of claim 1, wherein the controller includes a driver connecting the position encoder input line to the output line.

3. The system of claim 2, wherein the driver includes a transistor.

4. The system of claim 3, wherein the transistor is a metal oxide semiconductor transistor.

5. The system of claim 3, wherein the transistor is a bipolar junction transistor comprising a P-doped semiconductor layer between two N-doped semiconductor layers.

6. The system of claim 3, wherein the position encoder input line is connected to the base of the transistor and the output line is connected to the collector of the transistor.

7. The system of claim 6, further comprising a diagnostic module connected to the base of the transistor to apply a signal to the base to control connection of the encoder input line to the output line.

8. The system of claim 2, wherein the driver includes an inverter.

9. The system of claim 1, wherein the a position encoder input line comprises:
a first encoder input line to receive a first a position encoder signal; and,
a second encoder input line to receive a second position encoder signal, the first and second encoder signals being quadrature encoded.

10. The system of claim 9, wherein the diagnostic input line comprises first and second diagnostic input lines, the output line further comprising:
- a first output line couplable to the position encoder output channel; and,
- a second output line couplable to the position encoder output channel,
- the controller selectively connecting one of the first position encoder input line and the first diagnostic input line to the first output line and selectively connecting one of the second position encoder input line and the second diagnostic input line to the second output line.

11. The system of claim 10, further comprising a diagnostic module to provide quadrature encoded position encoder diagnostic signals.

12. A system to provide position encoder diagnostics comprising:
- a position encoder input line to receive a position encoder signal;
- an output line couplable to a position encoder output channel;
- a diagnostic module couplable to the position encoder input line and the output line, wherein access to the output line is controlled and the diagnostic module to diagnose a fault condition that was not diagnosable from the position encoder signal alone;
- a driver selectively connecting the position encoder input line to the output line under control of the diagnostic module wherein one of the position encoder signal and an output of the diagnostic module is provided to the encoder output channel.

13. The system of claim 12, wherein the driver includes an inverter.

14. The system of claim 12, wherein the driver includes a transistor.

15. The system of claim 14, wherein the position encoder input line is connected to the base of the transistor and the output line is connected to the collector of the transistor.

16. The system of claim 14, wherein the diagnostic module is connected to the base of the transistor to apply a signal to control connection of the encoder input line to the output line.

17. The system of claim 12, wherein:
the position encoder input line comprises:
- a first encoder input line to receive a first a position encoder signal; and,
- a second encoder input line to receive a second position encoder signal,
- the first and second encoder signals being quadrature encoded,
the output line comprises first and second output lines couplable to the position encoder output channel;
the driver comprises:
- a first driver selectively connecting the first position encoder input line to the first output line;
- a second driver selectively connecting the second position encoder input line to the second output line;
the diagnostic module being connected to the first driver to control connection of the first position encoder input line to the first output line and to the second driver to control connection of the second position encoder input line to the second output line.

18. A method to provide position encoder diagnostics comprising:
- receiving a position encoder signal on a position encoder input line;
- connecting the position encoder input line to an output line;
- in a diagnostic mode, connecting a diagnostic module to the output line in place of the position encoder line, wherein access to the output line is controlled and the diagnostic module to diagnose a fault condition that was not diagnosable from the position encoder signal alone.

19. The method of claim 18, wherein the position encoder signal is quadrature encoded, the method further comprising quadrature encoding an output from the diagnostic module.

20. The method of claim 18, further comprising in the diagnostic mode executing one or more test on one or more test targets selected from the set including: a position encoder connected to the position encoder input line; the position encoder input line; the output line; a sensor target for a position encoder connected to the position encoder input line; a transport on which the position coder is mounted; a drive to drive the transport.

* * * * *

UNITED STATES PATENT AND TRADEMARK OFFICE
CERTIFICATE OF CORRECTION

PATENT NO. : 9,211,741 B2
APPLICATION NO. : 13/550952
DATED : December 15, 2015
INVENTOR(S) : Javier González Bruno et al.

Page 1 of 1

It is certified that error appears in the above-identified patent and that said Letters Patent is hereby corrected as shown below:

IN THE CLAIMS

In column 6, line 61 approx., in Claim 1, delete "the a" and insert -- the --, therefor.

Signed and Sealed this
Twenty-sixth Day of April, 2016

Michelle K. Lee
*Director of the United States Patent and Trademark Office*